US010464837B2

(12) United States Patent
Rudl et al.

(10) Patent No.: US 10,464,837 B2
(45) Date of Patent: Nov. 5, 2019

(54) METHOD FOR INSERTING A CORE ROD INTO AN OUTER CLADDING TUBE WITH SPACER

(71) Applicants: HERAEUS QUARTZ NORTH AMERICA LLC, Buford, GA (US); HERAEUS QUARZGLAS GMBH & CO. KG, Hanau (DE)

(72) Inventors: Alexander Rudl, Buford, GA (US); Timothy D. Jenkins, Buford, GA (US)

(73) Assignees: HERAEUS QUARTZ NORTH AMERICA LLC, Buford, GA (US); HERAEUS QUARZGLAS GMBH & CO. KG, Hanau (DE)

( * ) Notice: Subject to any disclaimer, the term of this patent is extended or adjusted under 35 U.S.C. 154(b) by 214 days.

(21) Appl. No.: 15/563,266

(22) PCT Filed: Jun. 2, 2015

(86) PCT No.: PCT/US2015/033710
§ 371 (c)(1),
(2) Date: Sep. 29, 2017

(87) PCT Pub. No.: WO2016/195662
PCT Pub. Date: Dec. 8, 2016

(65) Prior Publication Data
US 2018/0072608 A1 Mar. 15, 2018

(51) Int. Cl.
*C03B 37/012* (2006.01)
*C03B 37/027* (2006.01)

(52) U.S. Cl.
CPC .... *C03B 37/01222* (2013.01); *C03B 37/0126* (2013.01); *C03B 37/01211* (2013.01);
(Continued)

(58) Field of Classification Search
CPC ......... C03B 37/01205; C03B 37/01211; C03B 37/0126
See application file for complete search history.

(56) References Cited

U.S. PATENT DOCUMENTS 5,785,729 A 7/1998 Yokokawa et al.
6,460,378 B1 * 10/2002 Dong ................ C03B 37/01211
65/412
(Continued)

FOREIGN PATENT DOCUMENTS

DE 102004054654 5/2006
EP 1182173 2/2002
JP 2001-287920 10/2001

OTHER PUBLICATIONS

International Search Report and Written Opinion for counterpart international patent application No. PCT/US2015/033710 dated Jan. 28, 2016 by the European Patent Office in its capacity as International Searching Authority.

*Primary Examiner* — Jason L Lazorcik
(74) *Attorney, Agent, or Firm* — Stradley Ronon Stevens & Young, LLP

(57) ABSTRACT

Methods for producing glass components and obtainted glass component, e.g. optical fiber preform. A method includes providing a cladding tube (110) with a longitudinal axis including a first and a second bore separated by a chamfered region (114); inserting a spacer (120) into the first bore; inserting a rod (130) into the first bore (116); moving the spacer (120) into the chamfered section (114), causing the spacer (120) to rotate within the chamfered region (114); and rotating the cladding tube (110) into a vertical orientation, whereby the spacer (120) is prevented from entering the second bore (118) and supports the rod (130). Each portion of the chamfered region has a height perpendicular to the longitudinal axis greater than the height of the second bore. The spacer has a length parallel to the longitudinal axis greater than the height of the second bore but less the distance between the deepest point of the bottom of the chamfered region and an intersection of the top of the chamfered region and the first bore.

15 Claims, 5 Drawing Sheets

(52) U.S. Cl.
CPC .. *C03B 37/01245* (2013.01); *C03B 37/01248*
(2013.01); *C03B 37/02754* (2013.01)

(56) References Cited

U.S. PATENT DOCUMENTS

| | | | |
|---|---|---|---|
| 7,028,508 B2 | 4/2006 | Fabian et al. | |
| 8,161,772 B2 | 4/2012 | Sattmann | |
| 2004/0107735 A1* | 6/2004 | Fletcher, III | C03B 37/01211 |
| | | | 65/412 |
| 2006/0174659 A1 | 8/2006 | Ganz et al. | |
| 2008/0028797 A1* | 2/2008 | Sattmann | C03B 37/0126 |
| | | | 65/393 |
| 2013/0333421 A1* | 12/2013 | Hamaguchi | C03B 37/0216 |
| | | | 65/377 |

\* cited by examiner

METHOD FOR INSERTING A CORE ROD INTO AN OUTER CLADDING TUBE WITH SPACER

TECHNICAL FIELD

The invention relates generally to producing elongated glass components, and particularly to a method for producing a glass component made from quartz glass in an arrangement including a core rod or tube surrounded by one or more quartz glass cladding tubes.

BACKGROUND

Optical fibers are waveguides that can transmit light, with minimal scattering and attenuation, between two locations. Optical fibers, also sometimes called fiber optics, are well known and used, for example, for illumination, communications, information transfer, and sensors. Optical fibers are typically flexible and very thin, and have a transparent core surrounded one or more transparent cladding layers. The core and cladding layers are made of vitreous material, such as high quality glass (made from, e.g., silica, fluoride, phosphates, etc.). Typically, the core material has a refractive index which is greater than the refractive index of the material in the surrounding cladding layer or layers. These conditions enable total internal reflection of light signals passing through the fiber, resulting in an efficient waveguide.

Optical fibers are generally manufactured by drawing the fiber from a heated preform using a fiber drawing tower. Such towers are typically vertically oriented and have a guide to hold and guide a preform, end first, into the top of the tower, as well as a high temperature furnace to heat the preform in a controlled manner, and an apparatus to apply controlled tension to the leading end of the preform, whereby a fiber of molten material forms. The fiber is typically cooled and solidified as it is drawn from the preform to provide a fine continuous optical fiber.

Optical components, either in the form of intermediate products (preforms or simple solid cylinders) for an optical fiber or also directly in the form of the end product itself in the form of the optical fiber, are produced by collapsing and elongating an arrangement including a core rod and a cladding tube surrounding the core rod. In some cases, multiple cladding tubes may be used. This process is typically referred to as rod-in-tube (RIT) or rod-in-cylinder (RIC).

In this method the core rod is positioned within the cladding tube in a vertical arrangement. In some cases, the core rod may be supported at its bottom by a support rod inserted into the bottom of the cladding tube. In other cases, the core rod may be supported by a holding ring or disk positioned in a constricted bottom portion of the cladding tube. The holding ring or disk has an outer diameter smaller than the inner diameter of the cladding tube, but larger than the inner diameter of the constricted portion, so that the holding ring comes to rest from above on the area of the constricted portion. The gap between the outer diameter of the core rod and the inner diameter of the cladding tube is sealed at one end of the core rod and a vacuum is applied to the gap from the other end of the core rod. The cladding tube and core rod are then heated while maintaining the vacuum, resulting in the cladding tube collapsing around the core rod. In other processes, the cladding tube and core rod may be heated prior to applying the vacuum to the gap between the core rod and the cladding tube.

One drawback of the above method is that the core rod is pulled down by its own weight while heating the outer cladding tube, resulting in deformation leading to an inconsistent outer diameter of the core rod, the core rod slipping out of its intended position within the cladding tube, or both. An inconsistent outer diameter of the core rod or the core rod not being in the correct position can lead to variations in the "b/a ratio" of the glass component (i.e., the ratio of the cladding tube diameter to the core rod diameter for a given cross section of the glass component). In some applications such as optical fibers, even small deviations from the desired b/a ratio are unacceptable. In extreme cases, weight-related deformation of the core rod can even lead to the core rod breaking. Core rod deformation is increasingly a problem as the length of the core rod increases. Although the application of a negative pressure to the gap between the outer diameter of the core rod and the inner diameter of the cladding tube can counteract the gravitational forces acting on the core rod, there arises a maximum pressure difference between the gap and the outside of the cladding tube, particularly when atmospheric pressure is applied externally.

Typical solutions to preventing weight-related deformation include using two core rod segments, where the bottom segment is supported by a support rod or holding ring as described above and the top segment is supported at a point above the bottom segment. For example, in U.S. Pat. No. 8,161,772, the cladding tube includes a necked portion of reduced inner diameter. The top core rod segment is then supported by the necked portion, either directly by the necked portion or by a spacer disk supported by the necked portion. However, such methods are generally undesirable because they require core rods of different diameters; hot working, welding, or machining of the core rods or cladding tubes; or both. Requiring core rods of specific diameters reduces the possible configurations the methods can produce, while hot working, welding, or machining can increase costs and causes stresses on the components that can reduce quality or reliability.

SUMMARY

In one embodiment, a glass component is produced by inserting a glass spacer into a first inner bore of an outer cladding tube also including a second inner bore separated from the first inner bore by a chamfered region. Each portion of the chamfered region has a height measured perpendicular to the longitudinal axis greater than the height of the second inner bore. The spacer has a length measured parallel to the longitudinal axis greater than the height of the second inner bore but less the greatest distance between a deepest point of the bottom of the chamfered region and an intersection of the top of the chamfered region and the first inner bore. A first core rod is then inserted into the first inner bore and the spacer is moved into the chamfered section, which causes the spacer to rotate within the chamfered region. When the cladding tube is rotated into a vertical orientation, the spacer is prevented from entering the second inner bore and the first core rod is supported by the spacer.

Embodiments further include a glass component having an outer cladding tube with a longitudinal axis, the outer cladding tube having a first inner bore and a second inner bore separated by a chamfered region; and a spacer positioned in the chamfered region. The second inner bore has a height measured perpendicular to the longitudinal axis, and each portion of the chamfered region has a height greater than the height of the second inner bore. The spacer has a length measured perpendicular to the longitudinal axis greater than height of the second inner bore but less than the height of the chamfered region, such that the spacer may fit in the chamfered region but not pass into the second inner bore. The glass component further includes a core rod in the first inner bore supported by the spacer.

BRIEF DESCRIPTION OF DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures.

DETAILED DESCRIPTION

Embodiments of the invention include methods of producing a glass component using a spacer to support a core rod in a cladding tube. The spacer is sized to fit down the inner bore of the cladding tube in a horizontal position, rotate into a vertical position inside a chamfered region of the inner bore. Once rotated into the vertical position, the spacer blocks the chamfered region, and a core rod inserted into the inner bore of the cladding tube will be supported by the spacer. Exemplary embodiments of the method will now be described in conjunction with FIGS. 1A-1F, 2A, 2B, 3A-3F, and 4.

Figure 1A:
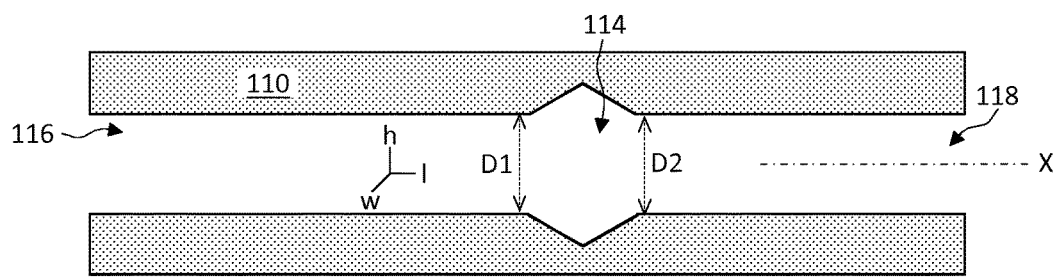
FIG. 1A is a cross-sectional view of a cladding tube including a chamfered region, according an exemplary embodiment.

Referring to FIG. 1A, a cladding tube 110 having a longitudinal axis X is provided. As used herein, "length" is measured parallel to the longitudinal axis X; "height" is measured perpendicular to the longitudinal axis X and parallel to the plane of the figures; and "width" is measured perpendicular to both the longitudinal axis X and the plane of the figures, as indicated by the coordinate system on FIG. 1A. Terms such as "top", "bottom," "left," and "right" refer to the orientation of the relevant figure. At certain steps of the methods described in this specification, the cladding tube 110 is rotated into different orientations. However, heights, widths, and lengths will still be described relative to the longitudinal axis X as stated above.

The cladding tube 110 includes a chamfered region 114 separating a first inner bore 116 and a second inner bore 118. The first bore 116 has a height of $D_1$ adjacent to the chamfered region 114. The second bore 116 has a height of $D_2$ adjacent to the chamfered region 114. In some embodiments, $D_1$ and $D_2$ are equal. In other embodiments, $D_1$ and $D_2$ are not equal. It will be apparent from this description that $D_1$ and $D_2$ may be chosen independently. The chamfered region 114 may have a constant or varying height as long as the height of the chamfered region 114 is always greater than $D_1$ and $D_2$. As depicted in FIG. 1A, the top and the bottom of the chamfered region 114 each has a triangular shape in cross section. In other embodiments, the chamfered region 114 may have any other suitable shape in cross section, including, but not limited to, polygonal, square, or round.

Typically, the heights of the first bore 116 and the second bore 118 are constant. However, the heights of the first bore 116 and the second bore 118 may vary along the length of the bores. The first bore 116 and the second bore 118 are also typically round, in which case the heights $D_1$ and $D_2$ are equal to the diameters of the bores (i.e., the inner diameter of the cladding tube). Although embodiments are not limited to any particular dimensions, the heights $D_1$ and $D_2$ typically range from approximately tens to hundreds of millimeters and the cladding tube 110 may have an outside diameter of up to hundreds of millimeters, but is not limited to that range. For example, when the cladding tube 110 forms part of an optical fiber preform, the cladding tube 110 may have an outer diameter of up to 110 mm in some embodiments. In other embodiments, an outside diameter of 135 mm to 210 mm or even larger may be desirable. It will be understood that embodiments are not limited to any particular dimensions. That is, the cladding tube 110 may have any outside diameter.

Figure 1B:
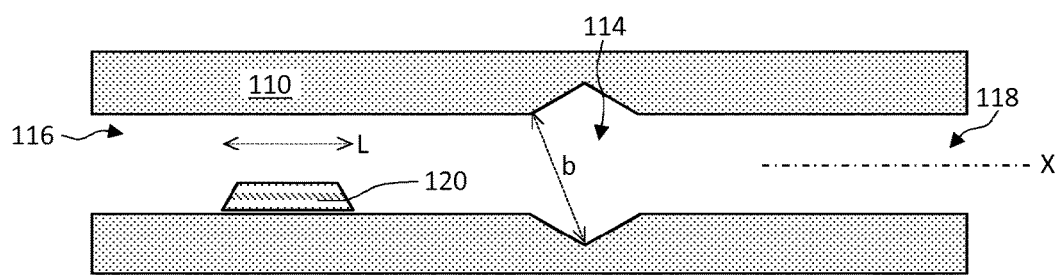
FIG. 1B is a cross-sectional view of inserting a spacer into the cladding tube, according to another exemplary embodiment.

Referring to FIG. 1B, a spacer 120 is inserted into the first inner bore 116 while the cladding tube 110 is in a non-vertical orientation. As will be explained in greater detail, the "non-vertical orientation" is any orientation where the force of gravity is sufficient to cause the spacer 120 to rotate within the chamfered region 114 rather than passing through into the second inner bore 118. In an exemplary embodiment, the cladding tube 110 may be in a substantially horizontal position. The spacer 120 is positioned in the first inner bore 116 in a horizontal orientation (i.e., parallel to the longitudinal axis X). The spacer 120 has a maximum length L. The spacer 120 may not be uniform in length. For example, as depicted in FIG. 1A, the spacer 120 is trapezoidal in cross section. Accordingly, the length L of the spacer 120 is equal to the length of the base of the trapezoid. The length L of the spacer 120 is greater than the heights $D_1$ and $D_2$, but less than a distance b equal to the distance between the deepest point of the bottom of the chamfered region 114 (in the horizontal orientation of FIG. 1A) and the nearest edge of the top of the chamfered region 114 (i.e., the intersection between the chamfered region 114 and the first inner bore 116). The other dimensions of the spacer 120 are discussed in greater detail below in conjunction with FIGS. 2A-2B.

Figure 1C:
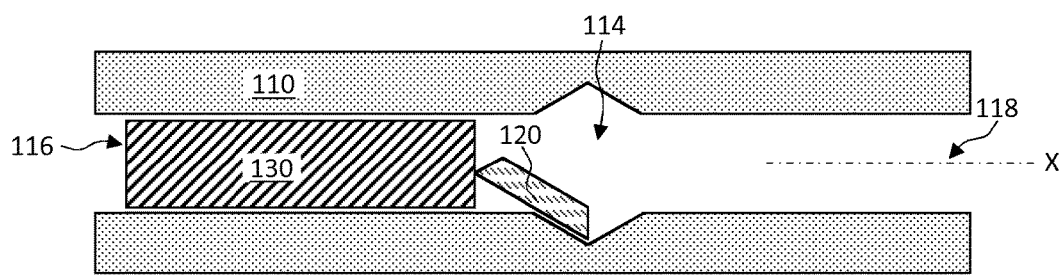
FIG. 1C is cross-sectional view of inserting a first core rod into the cladding tube on the opposite side of the spacer from the chamfered region and moving the spacer toward the chamfered region until the spacer begins to rotate within the chamfered region, according to another exemplary embodiment.

Referring next to FIG. 1C, the spacer 120 is moved into the chamfered region 114. In one embodiment, the spacer 120 is moved into the chamfered region 114 by rotating the cladding tube 110 such that gravity pulls the spacer 120 toward the chamfered region 114. In a preferred embodiment, a first core rod 130 is inserted into the first inner bore 116 such that the spacer 120 is between the first core rod 130 and the chamfered region 114. The first core rod 130 is then inserted further into the first inner bore 116 to push the spacer 120 toward the chamfered region 114. Although FIG. 1B depicts only a single core rod 130, it will be understood that in other embodiments, multiple core rods may be inserted into the first inner bore 116. For example, multiple core rods could be inserted in parallel to form a multi-core glass component. For another example, multiple core rods could be inserted in sequence to avoid the need for a single core rod of greater length. Once a sufficient portion of the spacer 120 is past the near edge of the chamfered region 114, it will tip into a rotated position due to the force of gravity, as depicted in FIG. 1C. As explained above, the cladding tube 110 must be sufficiently horizontal so that gravity forces the spacer 120 to rotate rather than simply slide through the chamfered region 114 and into second inner bore 118.

Figure 1D:
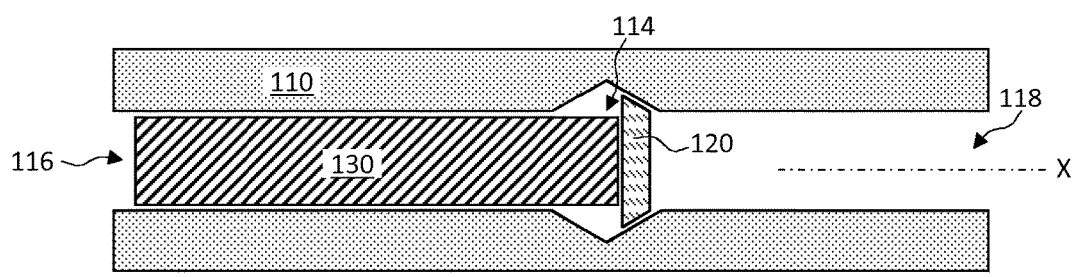
FIG. 1D is a cross-sectional view of the spacer being pushed into a vertical position at the far end of the chamfered region by the core rod, according to another exemplary embodiment.

Referring next to FIG. 1D, once the spacer 120 is in the rotated position, the first core rod 130 continues to push the spacer 120 into the far end of the chamfered region 114 (i.e., the opposite end of the chamfered region 114 relative to the end the first core rod 130 is inserted into) and into a vertical position (i.e., the length L of the spacer, originally parallel to the longitudinal axis X of the cladding tube 110, is now perpendicular to the longitudinal axis). Because the length L of the spacer 120 is less than the distance b, the spacer 120 is able to rotate inside the chamfered region 114 to fit into the chamfered region 114 in the vertical position. If the length L of the spacer 120 was greater than the distance b, the spacer 120 would not be able to fully rotate into the rotated position. Because the length L of the spacer 120 is greater than the height D2 of the second inner bore 118, once in the rotated position, the spacer 120 blocks the chamfered region 114 and prevents the first core rod 130 from passing through the chamfered region 114. It will be understood that the spacer 120 does not need to rotate into a position where the length L of the spacer 120 is fully perpendicular to the longitudinal axis X of the cladding tube 110, but only into a sufficiently vertical position to no longer fit through the second inner bore 118 in the vertical position. In some embodiments, including the embodiment depicted in FIG. 1C, the leading edge of the spacer 120 (i.e., the edge opposite the first core rod 130 once the spacer 120 is in the rotated position) is shaped to match the contours of the chamfered region 114 in order to improve the fit between the spacer 120 and the chamfered region 114. However, in some embodiments, the shape of the spacer 120 may not match the shape of the chamfered region 114.

Figure 1E:
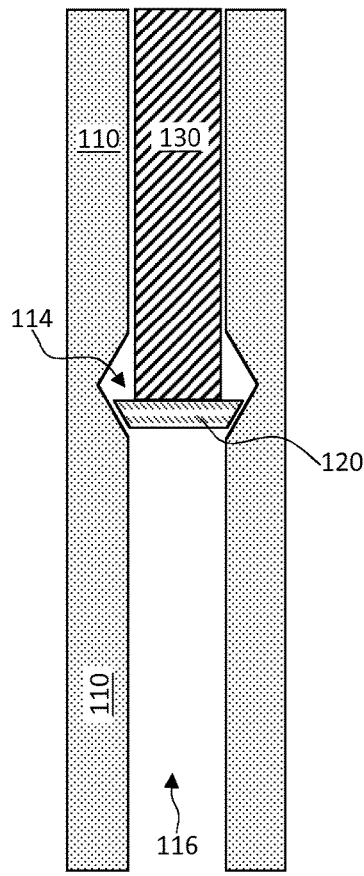
FIG. 1E is a cross-sectional view of the cladding tube, spacer, and core rod oriented in a vertical orientation, according to another exemplary embodiment.

Referring next to FIG. 1E, once the spacer 120 is in the vertical position, the cladding tube 110, along with the spacer 120 and the first core rod 130, is rotated into a vertical orientation. In an alternate embodiment, the cladding tube 110 may be moved into a vertical orientation once the spacer 120 is in the rotated position described above but not yet in the vertical position. Once the cladding tube 110 is in the vertical orientation, gravity will move the spacer 120 into the vertical (i.e., perpendicular to the longitudinal axis X) position.

Figure 1F:
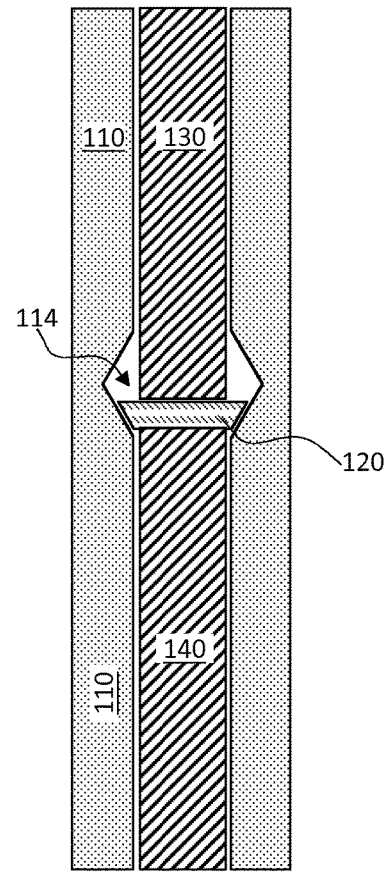
FIG. 1F is a cross-sectional view of a second core rod inserted into the cladding tube beneath the first core rod and the spacer, according to another exemplary embodiment.

Once the cladding tube 110 is in the vertical orientation, the weight of the first core rod 130 presses down on the spacer 120, such that the core rod 130 is supported by the spacer 120, which is prevented from passing through chamfered region 114 due to the size and shape of the spacer 120 and the size and shape of the chamfered region 114. As depicted in FIG. 1F, a second core rod 140 is inserted into the second inner bore 118. The second core rod 140 may be inserted either before or after the cladding tube 110 is rotated into the vertical orientation. The second core rod 140 may also be inserted into the second inner bore 118 of the cladding 110 through end of the cladding tube 110 adjacent to the second inner bore 118 or inserted through the chamfered region 114 prior to positioning the spacer 120 in the chamfered region 114. Like the first core rod 130, the second core rod 140 may consist or more than one core rod segment arranged in parallel, in sequence, or both. Once inserted, the second core rod 140 may be supported by any suitable method, such as with a holding ring or support rod (not shown) as described above. Once both the first core rod 130 and second core rod 140 are in position, a vacuum may be applied to the inner bore 112 and the cladding tube 110 heated to collapse the cladding tube 110 around the first core rod 130 and second core rod 140. Because the first core rod 130 is supported by the spacer 120 and the second core rod is supported at the bottom of the cladding tube 110, the core rod weight is distributed more evenly along the longitudinal axis of the cladding tube 110, thereby reducing the risk of weight-related deformation or the core rods slipping out of the cladding tube. In addition to reducing the risk of core rod breakage or b/a ratio deformation for a given length, the method described above allows for longer glass components to be manufactured. The method described above also allows for the dimensions of the core rods, as well as the heights diameters $D_1$ and $D_2$ of the first inner bore 116 and the second inner bore 118, respectively, to be selected independently from each other, as the first core rod 130 does not need to be in contact with the second inner bore 118 or the second core rod 140 contact for the first core rod 130 to be supported.

Figure 2A:
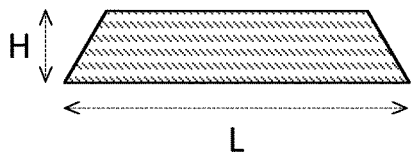
FIG. 2A is a side view of a spacer, according to another exemplary embodiment.
Figure 2B:
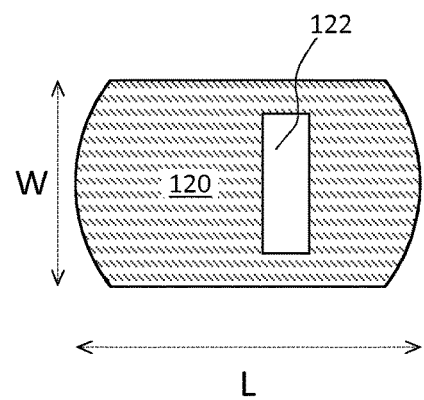
FIG. 2B is a top view of the spacer of FIG. 2A, according to another exemplary embodiment.

FIGS. 2A-2B depict side and top views, respectively, of the spacer 120 used in the methods described above. In addition to having a length L as described above, the spacer 120 also has a height H and a width W as shown in FIGS. 2A-2B. L, H, and W are defined as described above regarding FIG. 1A (i.e., length is measured parallel to the longitudinal axis X, height and width are measured perpendicular to the longitudinal axis X). The height H of the spacer 120 is sufficient to support the weight of the first core rod 130 without the spacer 120 breaking due to bending stress. In one exemplary embodiment, the minimum acceptable height of the spacer 120 may be determined by the following formula:

$$H=\mathrm{sqrt}[(F*L*1.5)/(W*\sigma_b)]$$

where F is the weight force of the first core rod (or multiple first core rods) 130, L is the length of the spacer 120, W is the width of the spacer 120, and $\sigma_b$ is the maximum bending stress for the material of the spacer 120. This formula is only exemplary, and in other embodiments the desired height H of the spacer may be calculated in other manners. The width W of the spacer 120 is preferably less than the widths of the first inner bore 116 and the second inner bore 118. When the inner bores are substantially round, the widths of the inner bores are equal to $D_1$ and $D_2$, as described above. Because the width W is less than the widths of the inner bores, the vacuum applied during the cladding tube collapse process can pass around the spacer 120 so that the vacuum is applied evenly to the entire length of the cladding tube 110.

In some embodiments, such as the embodiment depicted in FIG. 2B, the spacer 120 may be asymmetrically weighted to facilitate easier tipping of the spacer 120 into the vertical position (as described above in greater detail in conjunction with FIG. 1C). For example, as in FIG. 2B, the spacer 120 may include a hole 122 offset from the center of the length of the spacer 120, such that the rear half (i.e., the trailing half when the spacer is inserted into the cladding tube 110) is lighter in weight than the front half. Accordingly, the center of mass of the spacer is shifted toward the front half (i.e., the heavier half) and the spacer 120 will more easily tip into the chamfered region 114. In other embodiments, the weight of the spacer 120 may be made asymmetrical by any other design, such a thinner rear half, a hole that does not fully penetrate the spacer, additional weight added to the front half, etc. In other embodiments, the weight of the spacer 120 may be symmetrical.

In an exemplary embodiment, the cladding tube 110, the spacer 120, the first core rod 130, and the second core rod 140 may all be made of high-purity quartz glass formed by any suitable process, such as, but not limited to, one or more types of chemical vapor deposition (CVD), including inside vapor deposition, outside vapor deposition and vapor axial deposition. In some embodiments, the spacer 120 may be made of a lower quality sacrificial material to reduce costs the spacer 120 may preferably have similar thermal properties (e.g., melting temperature) as the core rods 130, 140 such that the spacer 120 does not disrupt the tube collapse or preform draw processes.

Figure 3A:
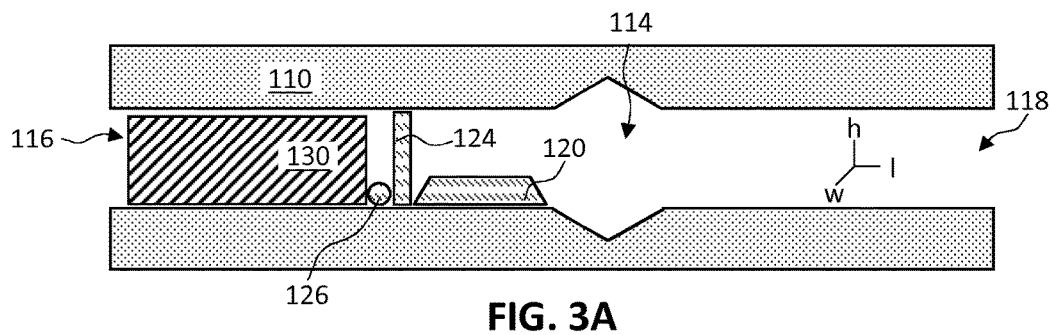
FIG. 3A is a cross-sectional view of a spacer, a guiding disk, and a guiding rod inserted into a cladding tube including a chamfered region in a horizontal orientation, according to another exemplary embodiment.

Referring next to FIGS. 3A-3F, in other embodiments, the method above may further include use of additional spacer elements to position the spacer 120 in the chamfered region 114. As depicted in FIG. 3A, the spacer 120 is positioned in the cladding tube 110 as described above. In this embodiment, however, a guiding disk 124 and a guiding rod 124 are positioned between the spacer 120 and the first core rod 130, with the guiding disk 124 adjacent to the spacer 120 and the guiding rod 126 adjacent to the first core rod 130. In an exemplary embodiment, the guiding disk 124 is initially substantially vertical or, alternatively angled toward the guiding rod 130. The guiding disk 124 may have any height up to the $D_1$ of the first inner bore 116. The diameter of the guiding rod 126 may be as large as will still fit in the chamfered region 114, as described in more detail below.

Figure 3B:
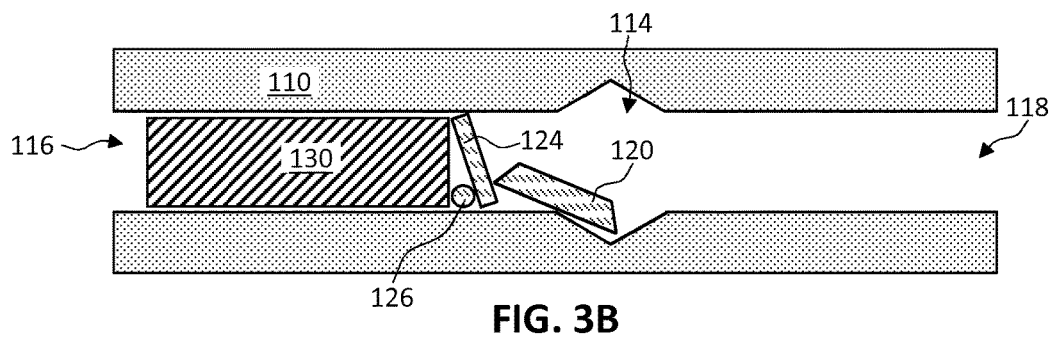
FIG. 3B is cross-sectional view of the spacer rotating into the chamfered region, according to another exemplary embodiment.

As depicted in FIG. 3B, the first core rod 130 then pushes the spacer 120, the guiding disk 124, and the guiding rod 126 toward the chamfered region 114. When the spacer 120 reaches the chamfered region 114, the front of the spacer 120 will begin to tip down into the chamfered region 114. As a result, the rear of the spacer 120 will contact the guiding disk 126 at a higher point, causing the guiding disk 126 to tip backwards into an angled position. The guiding rod 126 ensures the guiding disk 126 maintains the angled position between the spacer 120 and the first core rod 130. As the first core rod 130 is inserted further into the cladding tube 110, the guiding disk 126 will push the spacer 120 further into the chamfered region 114. Due to the angle of the guiding disk 126, the spacer 120 is able to more easily rotate into a more vertical position, thereby reducing the chance that the spacer 120 will be improperly positioned in the chamfered region 114 as well as preventing chipping or breaking of the spacer 120.

Figure 3C:
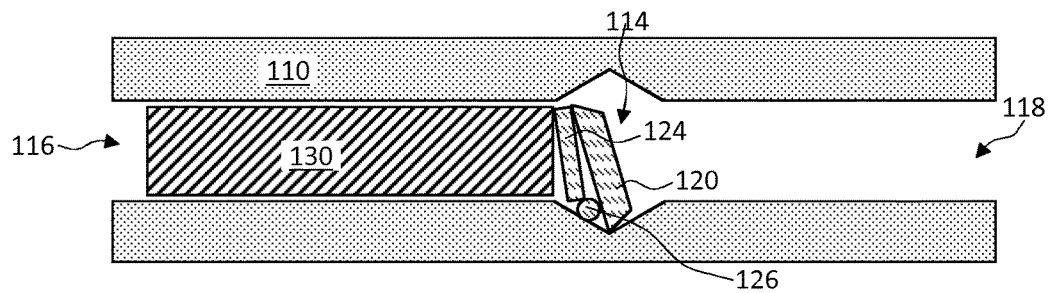
FIG. 3C is cross-sectional view of the spacer moving into a vertical position while the guiding rod falls into the bottom of the chamfered region, according to another exemplary embodiment.

As depicted in FIG. 3C, once the spacer 120 is in the vertical position and the first core rod 130 has pushed the guiding disk 124 and the guiding rod 126 into the chamfered region 114, the guiding rod 126 will fall into the bottom portion of the chamfered region 114 below the guiding disk 124. As a result, the guiding rod 126 is no longer between the guiding disk 124 and the first core rod 130, allowing for a solid and flat interface between the guiding disk 124 and the first core rod 130. This interface helps avoid unintentional movement of the first core rod 130 from its intended position within the cladding tube 110.

Figure 3D:
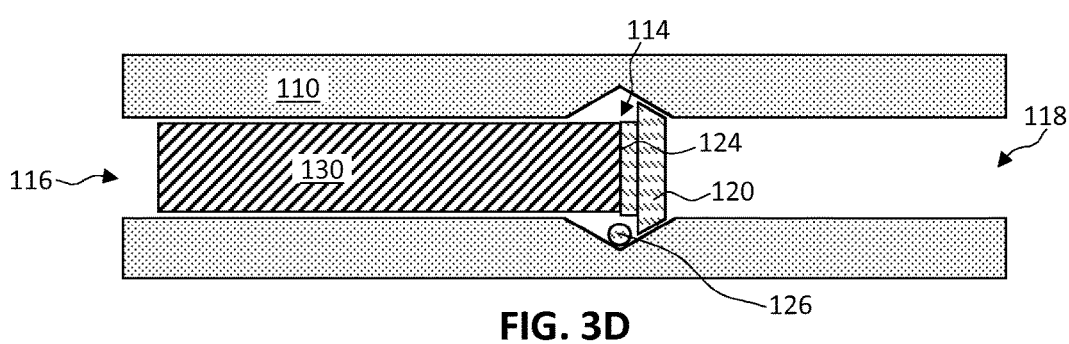
FIG. 3D is cross-sectional view of the spacer being pushed into a vertical position at the far end of the chamfered region by the core rod, according to another exemplary embodiment.
Figure 3E:
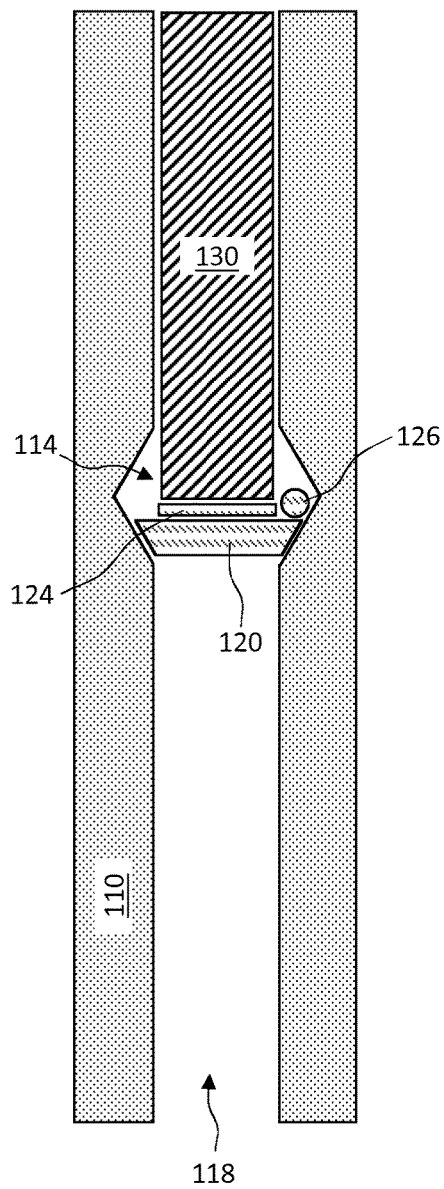
FIG. 3E is cross-sectional view of the cladding tube, spacer, guiding disk, guiding rod, and core rod oriented in a vertical orientation, according to another exemplary embodiment.
Figure 3F:
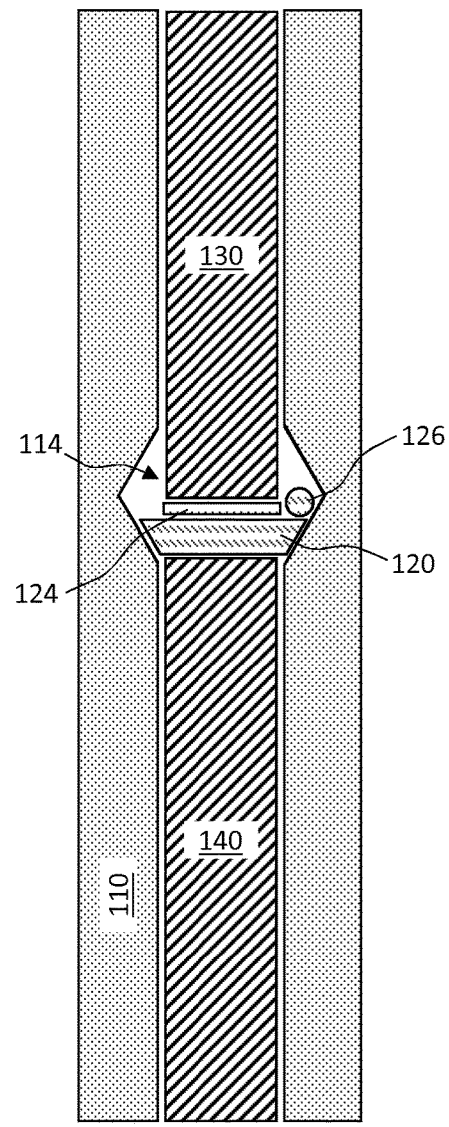
FIG. 3F is cross-sectional view of a second core rod inserted into the cladding tube beneath the first core rod, the guiding rod, the guiding disk, and the spacer, according to another exemplary embodiment.

Referring next to FIG. 3D, once the spacer 120 is in the vertical position, the first core rod 130 continues to push the spacer 120 and the guiding disk 124 into the far end of the chamfered region 114 (i.e., the opposite end of the chamfered region 114 relative to the end the first core rod 130 is inserted into). As explained above, because the length of the spacer 120 is greater than the height $D_2$ of the second inner bore 118, the spacer 120 once in the vertical position blocks the chamfered region 114 and prevents the first core rod 130 from passing through the chamfered region 114. Also as explained above, because the guiding rod 126 falls into the lower chamfered region 114, the guiding disk 124 is directly between the spacer 120 and the first core rod 130, forming a stable interface when the cladding tube 110 is rotated into the vertical orientation, as depicted in FIG. 3E. The second core rod 140 may then be inserted into the cladding tube 110 and the cladding tube 110 may proceed as described above. As also explained above, the second core rod 140 may be inserted before or after the first core rod 130 and the spacer 120 are inserted into the cladding tube 110 through either end of the cladding tube 110.

Figure 4:
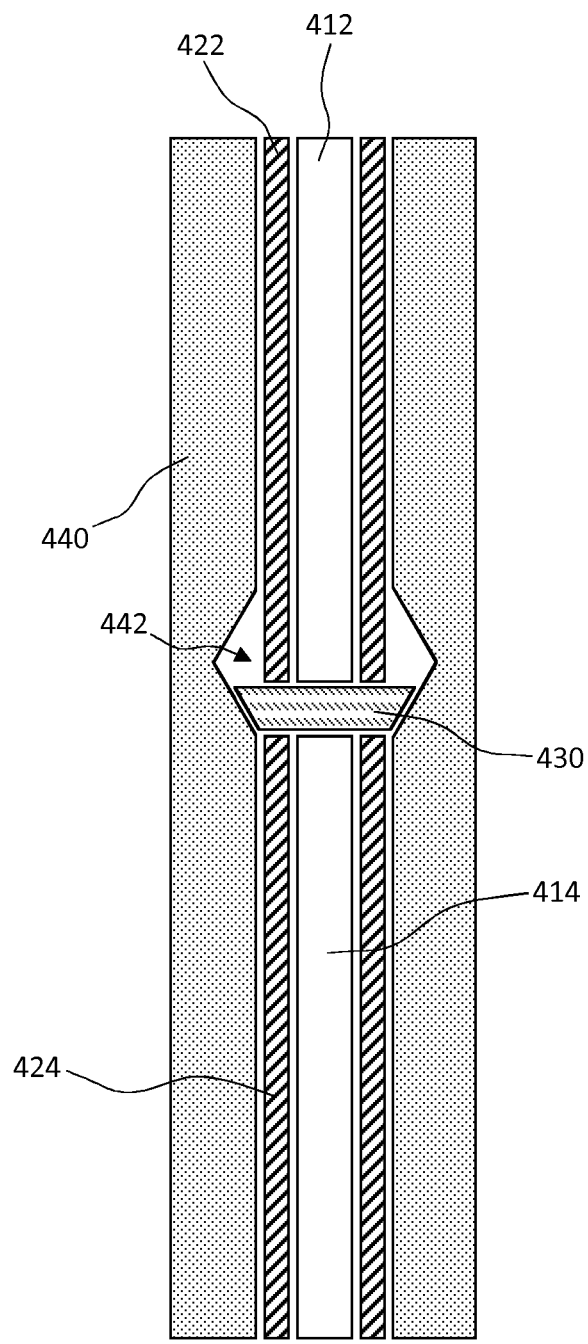
FIG. 4 is a is cross-sectional view of a glass component including an outer cladding tube, a spacer in a chamfered region of the outer cladding tube, a first inner cladding tube and a first core rod resting on the spacer, and a second inner cladding tube and a second core rod below the spacer, according to another exemplary embodiment.

Referring next to FIG. 4, it will be understood that the methods described above may also be utilized to fabricate glass components including an inner core rod surrounded by multiple cladding tubes, as well as other configurations of core rods and cladding tubes not specifically disclosed herein. As depicted in FIG. 4, an exemplary multi-layer glass component 400 includes an upper core rod 412 surrounded by an upper inner cladding tube 422 and a lower core rod 414 surrounded by a lower inner cladding tube 424. Although FIG. 4 depicts only a single inner cladding tube, other embodiments may include more than one inner cladding tube. The upper core rod 412 and the upper inner cladding tube 422 are separated from the lower core rod 414 and the lower inner cladding tube 424 by a spacer 430 resting in a chamfered region 442 of an outer cladding tube 440 surrounding the upper core rod 412, the upper inner cladding tube 422, the lower core rod 414 and the lower inner cladding tube 424. As explained above, the weight of the upper core rod 412 and the upper inner cladding tube 422 will rest on the spacer 420 when the glass component 400 is in a vertical position, eliminating the need to support the full weight of the core rods and the inner cladding tubes from below the glass component 400. Accordingly the weight of the core rods and the inner cladding tubes is distributed more evenly throughout the outer cladding tube, thereby reducing the risk of weight-related deformation or the core rod slipping out of position. In addition to reducing the risk of core rod breakage or b/a ratio deformation for a given length, the method described above allows for longer glass components to be manufactured.

The glass components produced by the methods described above may be end products in the form of optical fibers, or may be intermediate products in the form of preforms.

The foregoing description of preferred embodiments of the invention should be taken as illustrating, rather than as limiting the invention as defined by the claims. As will be readily appreciated, numerous variations and combinations of the features set forth above can be utilized without departing from the invention as set forth in the claims. Such variations are not regarded as a departure from the spirit and scope of the invention, and all such variations are intended to be included within the scope of the following claims.

What is claimed:

1. A method for producing a glass component, the method comprising:
   providing an outer cladding tube with a longitudinal axis, the outer cladding tube having a first inner bore and a second inner bore separated by a chamfered region, wherein the second inner bore has a first height measured perpendicular to the longitudinal axis, and each portion of the chamfered region has a height measured perpendicular to the longitudinal axis greater than the first height;
   inserting a spacer into the first inner bore, the spacer having a length measured parallel to the longitudinal axis greater than the first height but less the greatest distance between a deepest point of the bottom of the chamfered region and an intersection of the top of the chamfered region and the first inner bore;
   inserting a first core rod into the first inner bore;
   moving the spacer into the chamfered section, thereby causing the spacer to rotate within the chamfered region; and
   rotating the cladding tube into a vertical orientation, whereby the spacer is prevented from entering the second inner bore and the first core rod is supported by the spacer.

2. The method of claim 1, further comprising:
   inserting a second core rod into the second inner bore;
   heating the cladding tube, whereby the cladding tube collapses around the first core rod and the second core rod.

3. The method of claim 2, wherein the first core rod has an outer diameter equal to an outer diameter of the second core rod.

4. The method of claim 1, wherein the spacer has a width less than the length of the spacer.

5. The method of claim 1, wherein the spacer has a height sufficient to support the weight of the first core rod without breaking due to a bending stress applied to the spacer by the first core rod.

6. The method of claim 1, wherein the spacer is asymmetrically weighted with a heavier end and a lighter end, and the spacer is positioned in the first inner bore with the heavier end nearest the chamfered region.

7. The method of claim 6, wherein the spacer includes a hole in the lighter end.

8. The method of claim 1, further comprising inserting an inner cladding tube into the first inner bore surrounding the core rod, whereby the inner cladding tube is supported by the spacer when the outer cladding tube is rotated into the vertical orientation.

9. The method of claim 1, further comprising inserting a guiding element into the first inner bore between the spacer and the first core rod.

10. The method of claim 9, wherein the guiding element includes a disk.

11. The method of claim 10, wherein the guiding element further includes a rod between the disk and the first core rod.

12. The method of claim 11, wherein the rod is sized to fit within the bottom of the chamfered region.

13. The method of claim 10, wherein the disk has a diameter less than the height of the first inner bore.

14. The method of claim 1, wherein the spacer has a leading edge that is adjacent to the second inner bore when the spacer is rotated into the vertical position, and the leading edge of the spacer is shaped to fit the chamfered region.

15. The method of claim 1, wherein the spacer is trapezoidal in cross-section.

* * * * *